(12) United States Patent
Wakabayashi

(10) Patent No.: US 6,850,958 B2
(45) Date of Patent: Feb. 1, 2005

(54) BACKUP SYSTEM, BACKUP METHOD, DATABASE APPARATUS, AND BACKUP APPARATUS

(75) Inventor: Ryuji Wakabayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 408 days.

(21) Appl. No.: 09/992,247

(22) Filed: Nov. 16, 2001

(65) Prior Publication Data

US 2002/0178174 A1 Nov. 28, 2002

(30) Foreign Application Priority Data

May 25, 2001 (JP) ......................................... 2001-156396

(51) Int. Cl.[7] .......................... G06F 12/00; G06F 17/30
(52) U.S. Cl. ...................... 707/204; 707/201; 707/202; 707/203; 707/10
(58) Field of Search ................................ 707/201–204, 707/10

(56) References Cited

U.S. PATENT DOCUMENTS

| | | | | |
|---|---|---|---|---|
| 5,307,481 A | * | 4/1994 | Shimazaki et al. ........... | 714/11 |
| 5,640,561 A | * | 6/1997 | Satoh et al. ................. | 707/202 |
| 5,649,195 A | * | 7/1997 | Scott et al. .................. | 707/201 |
| 5,713,017 A | * | 1/1998 | Lin et al. ........................ | 707/8 |
| 5,740,434 A | * | 4/1998 | Eastep .......................... | 707/202 |
| 5,781,910 A | * | 7/1998 | Gostanian et al. .......... | 707/201 |
| 5,794,252 A | * | 8/1998 | Bailey et al. ................ | 707/202 |
| 5,864,851 A | * | 1/1999 | Breitbart et al. ............... | 707/8 |
| 5,884,328 A | * | 3/1999 | Mosher, Jr. .................. | 707/202 |
| 5,907,848 A | * | 5/1999 | Zaiken et al. ................ | 707/202 |
| 5,933,837 A | * | 8/1999 | Kung .......................... | 707/201 |
| 5,995,980 A | * | 11/1999 | Olson et al. ................. | 707/201 |
| 6,029,178 A | * | 2/2000 | Martin et al. ................ | 707/201 |
| 6,065,018 A | * | 5/2000 | Beier et al. .................. | 707/202 |
| 6,098,078 A | * | 8/2000 | Gehani et al. ............... | 707/203 |
| 6,199,074 B1 | * | 3/2001 | Kern et al. ................... | 707/204 |
| 6,205,449 B1 | * | 3/2001 | Rastogi et al. ............... | 707/202 |
| 6,266,669 B1 | * | 7/2001 | Brodersen et al. ............ | 707/10 |
| 6,411,985 B1 | * | 6/2002 | Fujita et al. ................. | 709/201 |
| 6,449,622 B1 | * | 9/2002 | LaRue et al. ................ | 707/201 |
| 6,526,417 B1 | * | 2/2003 | Perry .......................... | 707/202 |
| 6,584,477 B1 | * | 6/2003 | Mosher, Jr. .................. | 707/204 |
| 6,772,155 B1 | * | 8/2004 | Stegelmann .................... | 707/8 |
| 2002/0174108 A1 | * | 11/2002 | Cotner et al. ................... | 707/3 |

OTHER PUBLICATIONS

Bernstein, P.A., V. Hadzilacos and N. Goodman "Concurrancy, Control and Recovery in Database Systems", Addison–Wesley, pp. 265–311, 1987. ISBN 0–201–10715–5.*

King, R.P., N. Halim, H. Garcia–Molina and C.A. Polyzois "Management of a Remote Backup Copy for Disaster Recovery", AC Transactions on Database Systems, vol. 16, No. 2, pp. 338–368, Jun. 1991.*

(List continued on next page.)

*Primary Examiner*—Luke S Wassum
(74) *Attorney, Agent, or Firm*—Greer, Burns & Crain, Ltd.

(57) ABSTRACT

A backup system, a backup method, a database apparatus and a backup apparatus whereby loss of data is minimized in case of damage to the system. In the database apparatus, update information generating means generates, with respect to individual databases, update information indicating updates of the databases. Interrelation information generating means generates interrelation information indicating an interrelation between the update information for a certain database and the update information for other databases. Transmitting means transmits the update information and the interrelation information. In the backup apparatus, receiving means receives the update information and the interrelation information transmitted thereto, and backup databases hold backups of the contents of the databases. Interrelation determining means looks up the interrelation information received by the receiving means to determine the interrelation of each update information. Updating means updates the backup databases based on the update information whose interrelation is verified by the interrelation determining means.

6 Claims, 12 Drawing Sheets

OTHER PUBLICATIONS

Gray, J. and A. Reuter "Transaction Processing: Concepts and Techniques", San Francisco:Morgan Kaufmann Publishers, pp. 562–576 and 643–655, 1993.*

Sharma, A. "Fault Tolerance in Transaction Systems", Technical Report, The University of North Carolina at Chapel Hill, Apr. 30, 1997.*

* cited by examiner

| 250 | 251 | 252 | 253 |
|---|---|---|---|
| TRANSACTION MATCHING INFORMATION | DB IDENTIFICATION INFORMATION | REGION SPECIFICATION INFORMATION | UPDATE CONTENT INFORMATION |

FIG. 4

BACKUP SYSTEM, BACKUP METHOD, DATABASE APPARATUS, AND BACKUP APPARATUS

BACKGROUND OF THE INVENTION (1) Field of the Invention

The present invention relates to a backup system, a backup method, a database apparatus and a backup apparatus, and more particularly, to a backup system including a database apparatus having a plurality of databases and a backup apparatus for providing a backup of information stored in the database apparatus, a backup method, a database apparatus and a backup apparatus for such a system.

(2) Description of the Related Art

In recent highly information-oriented society, damage to information processing systems by an earthquake or the like can exert a nonnegligible influence on the society.

If a database apparatus is damaged by disaster, data that had been collected before the disaster can possibly be lost, and if this occurs, not only continued provision of service fails but also the loss of data of high utility value accumulated over a long term entails an enormous loss of property.

To avoid such a situation, a backup apparatus for providing a backup of data stored in a database apparatus is installed at a remote place and the two are connected to each other by a high-speed digital line etc. to maintain identity of their data so that even in the event the database apparatus suffers from disaster, service can be continuously provided by the backup apparatus.

FIG. 11 is a conceptual diagram illustrating operation of a conventional database apparatus in combination with a backup apparatus.

As shown in FIG. 11, a database apparatus 10 comprises an application program 10a, a database (hereinafter abbreviated as DB) #a 10b, and a DB#b 10c.

Log files #1 and #2 are in practice constituted by a high-speed digital line etc. and transfer journals, which indicate the contents of updates of the DB#a 10b and DB#b 10c updated as a result of transactions carried out by the application program 10a, to a backup apparatus 20.

The backup apparatus 20 is constituted by parts associated respectively with the DB#a 10b and DB#b 10c. The part associated with the DB#a 10b comprises an editing section 21a, an edited data set storage section 21b, a reflecting section 21c, a spanned data storage section 21d, and a backup DB#a 21e. On the other hand, the part associated with the DB#b 10c comprises an editing section 22a, an edited data set storage section 22b, a reflecting section 22c, a spanned data storage section 22d, and a backup DB#b 22e.

When a request for processing, for example, has been made by a client device, not shown, the application program 10a of the database apparatus 10 performs a corresponding transaction. If, on completion of the transaction, it is found that data needs to be updated, the application program updates the contents of the DB#a 10b and DB#b 10c, and also creates journals indicating the contents of updates. The data associated with the DB#a 10b is transmitted as the log file #1, while the data associated with the DB#b 10c is transmitted as the log file #2.

The editing section 21a acquires journals relating to the DB#a 10b, among those transmitted from the database apparatus 10, and performs, for example, an editing process such as rearrangement of order of journals and a process for verifying the interrelation of journals.

The edited data set storage section 21b temporarily stores journals whose interrelation has been verified, among those edited by the editing section 21a.

The reflecting section 21c looks up the journals stored in the edited data set storage section 21b and updates the DB#a 21e.

The spanned data storage section 21d stores journals whose interrelation could not be verified.

On the other hand, the editing section 22a acquires journals relating to the DB#b 10c, among those transmitted from the database apparatus 10, and performs, like the editing section 21a, an editing process such as rearrangement of order of journals and a process for verifying the interrelation of journals.

The edited data set storage section 22b temporarily stores journals edited by the editing section 22a.

The reflecting section 22c looks up the journals stored in the edited data set storage section 22b and updates the DB#b 22e.

The spanned data storage section 22d stores journals whose interrelation could not be verified.

Operation of the aforementioned conventional apparatus will be now described. Let it be assumed that a certain transaction has been conducted by the application program 10a of the database apparatus 10 and that as a result, the contents of the DB#a 10b and DB#b 10c are updated.

Thereupon, a journal a1 indicating the contents of updates of the DB#a 10b and a journal b1 indicating the contents of updates of the DB#b 10c are created, as shown in the leftmost part of FIG. 12. The journals a1 and b1 are transmitted to the backup apparatus 20 as the log files #1 and #2, respectively.

In the backup apparatus 20, the editing section 21a receives the journal a1 transmitted thereto as the log file #1, performs the predetermined editing process, and then stores the edited journal in the edited data set storage section 21b. Also, the editing section 22a receives the journal b1 transmitted thereto as the log file #2, performs the predetermined editing process, and then stores the edited journal in the edited data set storage section 22b.

Let it be assumed that another transaction is thereafter conducted by the application program 10a and that journals a2 and b2 are created. As in the aforementioned case, these journals are transmitted to the backup apparatus 20 as the log files #1 and #2, respectively, are subjected to the editing process by the editing sections 21a and 22a, respectively, and then stored in the respective edited data set storage sections 21b and 22b.

If still another transaction is thereafter conducted by the application program 10a and a journal b3 alone is created, this journal is transmitted to the backup apparatus 20 as the log file #2, and then is stored in the edited data set storage section 22b after being subjected to the editing process by the editing section 22a.

Similarly, if a further transaction is conducted by the application program 10a and a journal b4 alone is created, this journal is transmitted to the backup apparatus 20 as the log file #2, and then is stored in the edited data set storage section 22b after being subjected to the editing process by the editing section 22a.

In this manner, the journals a1, a2 and b1–b4 are created and transmitted to the backup apparatus 20, whereupon the reflecting sections 21c and 22c perform a process for updating the DB#a 21e and DB#b 22e, respectively, based on the journals.

Specifically, the reflecting sections 21c and 22c look up the journals stored in each other's edited data set storage section 22b, 21b to see if there is a journal interrelated with the one stored in their own edited data set storage sections 21b and 22b. If such a journal exists, the reflecting section acquires the corresponding journal and performs the updating process.

In the aforementioned example, the journals a1 and a2 are interrelated with the journals b1 and b2, respectively. Accordingly, the reflecting section 21c updates the DB#a 21e based on the journals a1 and a2, and the reflecting section 22c updates the DB#b 22e based on the journals b1 and b2. The DBs are updated only if there exist interrelated journals (e.g., the journals a1 and b1), in order to ensure consistency of data in the two DBs.

Journals a3 and a4 interrelated with the journals b3 and b4 do not exist, and therefore, the journals b3 and b4 are temporarily stored in the spanned data storage section 22d as spanned data.

If journals a5 and b5, for example, are received thereafter, the reflecting section 22c judges that the journals a3 and a4 do not exist, so that the reflecting section 22c acquires the journals b3 and b4 from the spanned data storage section 22d and updates the DB#b 22e based on the acquired journals.

The process described above enables the DB#a 21e and DB#b 22e of the backup apparatus 20 to hold respective backups of the data stored in the DB#a 10b and DB#b 10c of the database apparatus 10.

However, if the database apparatus 10 is damaged by disaster while spanned data is held in the spanned data storage section 21d or 22d, then no succeeding journals are transmitted any longer. It is therefore impossible to determine whether the spanned data is a journal interrelated with some other journal or not, so that the spanned data has to be discarded.

Accordingly, the conventional system is associated with a problem that since the interrelation cannot be verified in case of damage due to disaster, there is no alternative but to discard journals that originally need not be discarded.

Further, if journals are discarded, consistency between the backup apparatus 20 and the database apparatus 10 cannot be guaranteed, making it difficult to immediately resume the service.

SUMMARY OF THE INVENTION

The present invention was created in view of the above circumstances, and an object thereof is to provide a backup system which ensures reliable backup of data even in the case where a database apparatus is damaged by disaster such as an earthquake and which also permits prompt resumption of service by means of a backup apparatus, and to provide a backup method, a database apparatus and a backup apparatus for such a system.

To achieve the above object, there is provided a backup system including a database apparatus having a plurality of databases and a backup apparatus for holding a backup of information stored in the database apparatus. The database apparatus of the backup system comprises update information generating means for generating, with respect to the individual databases, update information indicating contents of updates of the databases, interrelation information generating means for generating interrelation information indicating an interrelation between the update information for a certain database and the update information for other databases, and transmitting means for transmitting the update information and the interrelation information to the backup apparatus. The backup apparatus comprises receiving means for receiving the update information and the interrelation information transmitted from the database apparatus, backup databases for holding backups of contents of the databases owned by the database apparatus, interrelation determining means for looking up the interrelation information received by the receiving means to determine the interrelation of each update information, and updating means for updating the backup databases based on the update information of which the interrelation is verified by the interrelation determining means.

Also, to achieve the above object, there is provided a database apparatus having a plurality of databases. The database apparatus comprises update information generating means for generating, with respect to the individual databases, update information indicating contents of updates of the databases, interrelation information generating means for generating interrelation information indicating an interrelation between the update information for a certain database and the update information for other databases, and transmitting means for transmitting the update information and the interrelation information to a backup apparatus.

Further, to achieve the above object, there is provided a backup apparatus for holding a backup of information stored in a database apparatus. The backup apparatus comprises receiving means for receiving update information and interrelation information transmitted from the database apparatus, backup databases for holding backups of contents of databases owned by the database apparatus, interrelation determining means for looking up the interrelation information received by the receiving means to determine the interrelation of each update information, and updating means for updating the backup databases based on the update information of which the interrelation is verified by the interrelation determining means.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 is a diagram showing an exemplary data structure of a journal;

DESCRIPTION OF THE PREFERRED EMBODIMENTS

Embodiments of the present invention will be hereinafter described with reference to the drawings.

Figure 1:
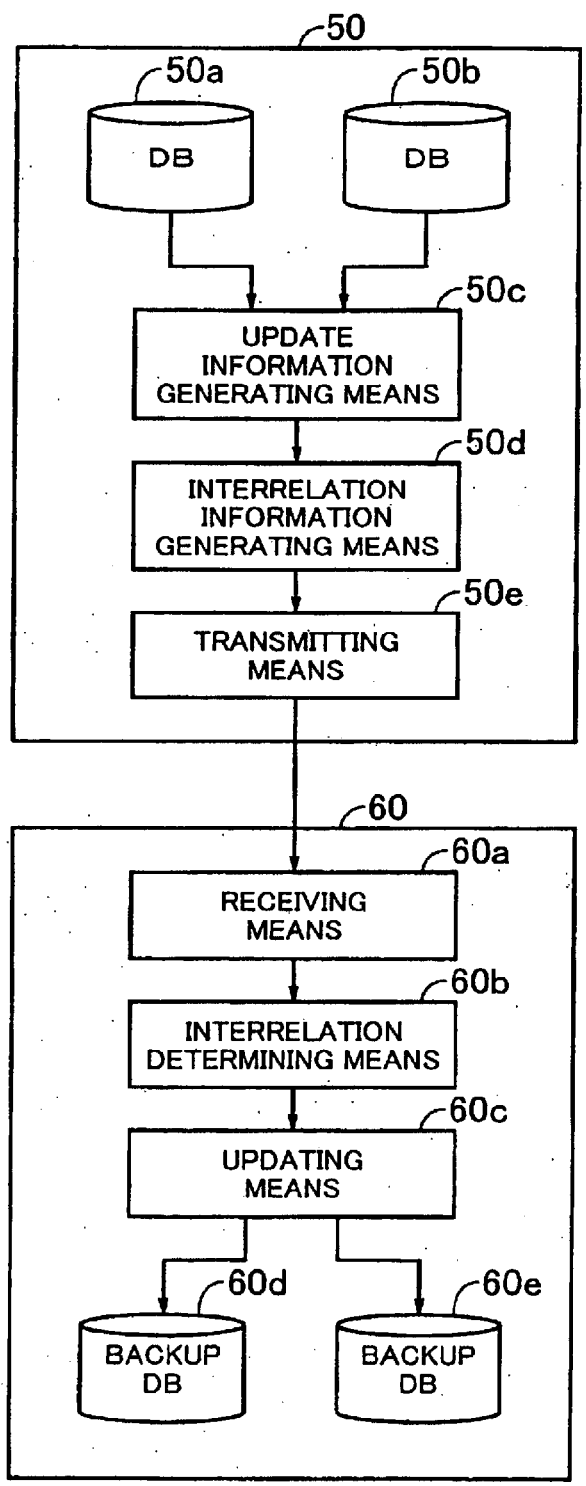
FIG. 1 is a diagram illustrating the principle of operation according to the present invention.

FIG. 1 illustrates the principle of operation according to the present invention. As shown in FIG. 1, a database apparatus 50 comprises DBs 50a and 50b, update information generating means 50c, interrelation information generating means 50d and transmitting means 50e. The database apparatus stores data derived as a result of various transactions in the DBs 50a and 50b, and also causes a backup apparatus 60 to hold a backup of the information stored in the DBs.

The DBs 50a and 50b store data generated as a result of transactions in a manner such that the data is classified according to types.

The update information generating means 50c generates, with respect to the individual DBs, update information indicating contents of updates of the DBs which are updated as transactions are conducted.

The interrelation information generating means 50d generates interrelation information indicating the interrelation between the update information for one DB and the update information for the other DB.

The transmitting means 50e transmits the update information and the interrelation information to the backup apparatus 60.

The backup apparatus 60 comprises receiving means 60a, interrelation determining means 60b, updating means 60c, and backup DBs 60d and 60e.

The receiving means 60a receives the update information and the interrelation information transmitted from the database apparatus 50.

The backup DBs 60d and 60e hold backups of the contents of the DBs 50a and 50b owned by the database apparatus 50.

The interrelation determining means 60b looks up the interrelation information received by the receiving means 60a to determine the interrelation of each update information.

The updating means 60c updates the data stored in the backup DBs 60d and 60e based on the update information of which the interrelation is verified by the interrelation determining means 60b.

The database apparatus 50 and the backup apparatus 60 may be installed at different places and connected to each other by a leased line or the like, or may be installed on the same site and connected to each other by a network (e.g., LAN).

Operation in accordance with the illustrated principle will be now described.

If, on completion of a transaction, the contents of the DBs 50a and 50b are updated, the update information generating means 50c acquires contents of the updates of the individual DBs and generates update information. Let it be assumed that transactions #1 to #4, for example, have been conducted. As a result of the transaction #1, update information a1 and update information b1 are generated in relation to the DBs 50a and 50b, respectively.

Also, update information a2 and update information b2 are generated as a result of the transaction #2, update information a3 is generated as a result of the transaction #3, and update information a4 is generated as a result of the transaction #4. The update information is affixed with information indicating a database with respect to which the update information has been generated.

The interrelation information generating means 50d generates interrelation information which is information indicating the interrelation of the update information generated by the update information generating means 50c. Specifically, "b1" is affixed as the interrelation information to the update information a1 to indicate that the update information a1 is interrelated with the update information b1. Also, "a1" is affixed as the interrelation information to the update information b1 to indicate that the update information b1 is interrelated with the update information a1.

Similarly, "b2" and "a2" are affixed as the interrelation information to the update information a2, b2, respectively, to indicate the interrelation with each other.

The update information a3, a4 has no update information interrelated therewith, and in this case, "b2" affixed to the immediately preceding update information is also affixed to the update information a3, a4 as the interrelation information.

The transmitting means 50e transmits the update information affixed with the thus-generated interrelation information to the backup apparatus 60.

The receiving means 60a receives the update information transmitted from the database apparatus 50 and supplies the received information to the interrelation determining means 60b.

The interrelation determining means 60b determines the interrelation of the received update information a1–a4, b1, b2 based on the corresponding interrelation information. Specifically, the update information a1 is affixed with "b1" as the interrelation information while the update information b1 is affixed with "a1" as the interrelation information; therefore, the interrelation determining means 60b judges that the update information a1 and the update information b1 are interrelated with each other, and notifies the updating means 60c of the result. The interrelation determining means 60b stores in a built-in memory thereof the update information of which the interrelation could be verified, so that the stored information can be used for the determination of succeeding update information.

The updating means 60c acquires the update information a1, b1 of which the interrelation could be verified, then looks up the aforementioned information affixed to each update information and indicating the database with which the update information is associated, and judges that the update information a1 and the update information b1 should be associated respectively with the backup DBs 60d and 60e. Then, the updating means 60c updates the backup DB 60d based on the update information a1, and updates the backup DB 60e based on the update information b1.

Also with respect to the update information a2, b2, the interrelation determining means 60b determines their interrelation by the same method as described above. As a consequence, the updating means 60c updates the backup DB 60d based on the update information a2, and updates the backup DB 60e based on the update information b2.

Subsequently, the interrelation determining means 60b acquires the update information a3. Update information b3 does not exist, and therefore, with the conventional system, it is not possible at this stage to determine whether or not the update information a3 should be used for updating. According to this embodiment, by contrast, the interrelation determining means 60b looks up the interrelation information "b2" affixed to the update information a3 as well as the update information which is stored in the aforementioned built-in memory and which was already used for updating, whereupon the interrelation determining means 60b recognizes that the update information b2 with which the update information a3 is interrelated has already been used for updating, and concludes that there is no update information interrelated with the update information a3.

The updating means 60c updates the backup DB 60d based on the update information a3 which is judged to have no interrelated update information.

The interrelation determining means 60b then acquires the update information a4 and judges by the same process as performed with respect to the update information a3 that there is no update information interrelated with the update information a4. As a consequence, the updating means 60c updates the backup DB 60d based on the update information a4.

In the embodiment explained above, the database apparatus 50 affixes interrelation information to the update information, and the backup apparatus 60 performs updating while looking up the interrelation information. This makes it possible to minimize the update information that is discarded without being used for updating the database because its interrelation is unknown.

Also, the interrelation information affixed to the received update information is looked up and the update information is used for updating before succeeding update information arrives, whereby reliable backup is ensured even in cases where the transmission of update information is interrupted due to an earthquake or the like.

A specific embodiment of the present invention will be now described.

Figure 2:
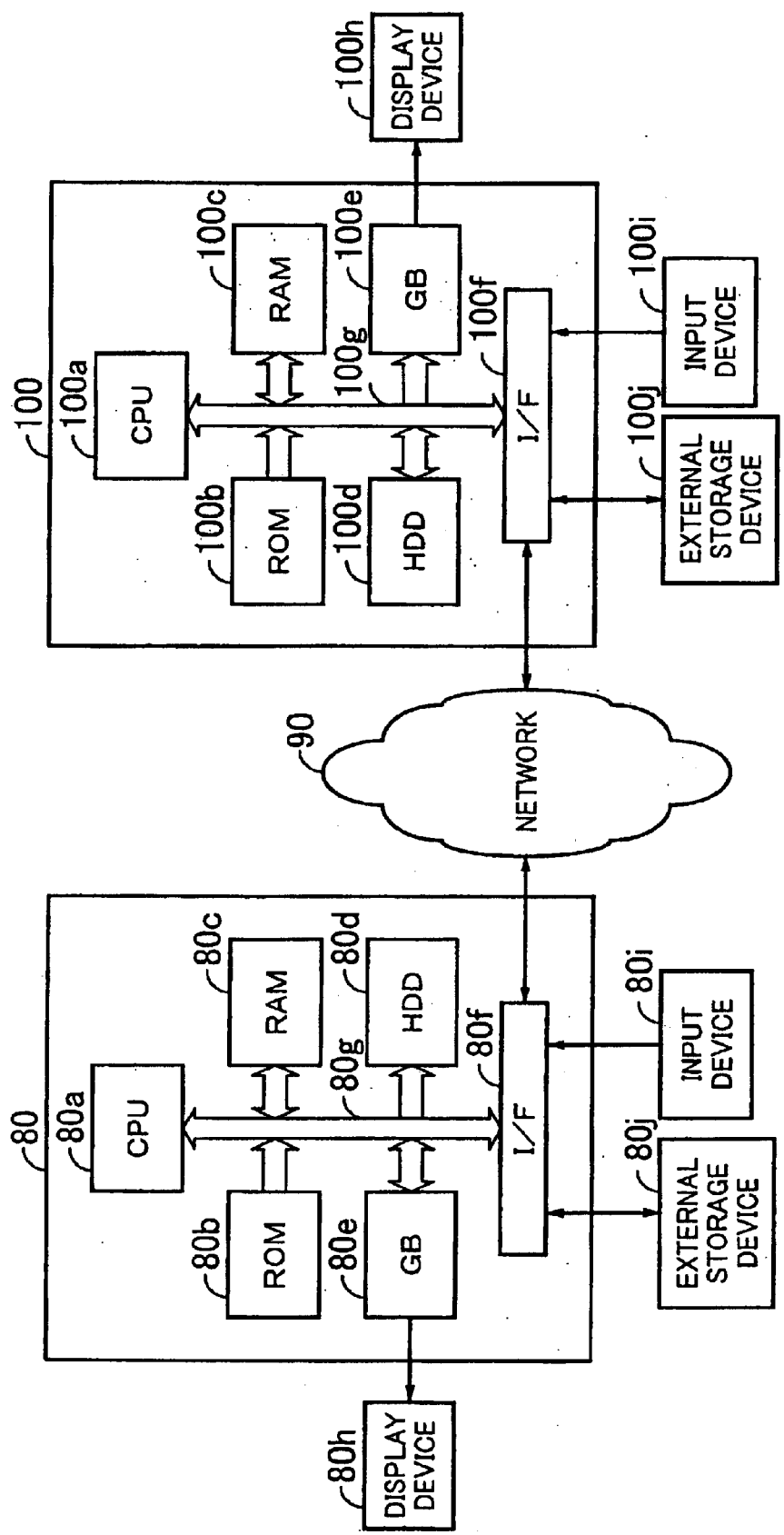
FIG. 2 is a diagram illustrating an exemplary configuration according to an embodiment of the present invention.

FIG. 2 illustrates an exemplary configuration according to the embodiment of the present invention. As shown in FIG. 2, a database apparatus 80 comprises a CPU (Central Processing Unit) 80a, a ROM (Read Only Memory) 80b, a RAM (Random Access Memory) 80c, an HDD (Hard Disk Drive) 80d, a GB (Graphics Board) 80e, an I/F (Interface) 80f, a bus 80g, a display device 80h, an input device 80i, and an external storage device 80j. The database apparatus 80 updates databases stored in the HDD 80d or the external storage device 80j in accordance with transactions, generates journals as the update information indicating the contents of the updates, and transmits the generated journals to a backup apparatus 100 via a network 90.

The backup apparatus 100 comprises a CPU 100a, a ROM 100b, a RAM 100c, an HDD 100d, a GB 100e, an I/F 100f, a bus 100g, a display device 100h, an input device 100i, and an external storage device 100j. The backup apparatus 100 receives the journals transmitted thereto from the database apparatus 80 via the network 90, and updates backup databases stored in the HDD 100d and the external storage device 100j.

The network 90 comprises, for example, a leased line such as a digital line, and permits exchange of information between the database apparatus 80 and the backup apparatus 100.

The CPU 80a of the database apparatus 80 controls the individual sections of the apparatus and also performs various operations in accordance with programs stored in the HDD 80d.

The ROM 80b stores basic programs executed by the CPU 80a, data, etc.

The RAM 80c temporarily stores programs being executed by the CPU 80a and data derived in the middle of operations.

The HDD 80d stores programs to be executed by the CPU 80a as well as various data.

The GB 80e performs a drawing process in accordance with a draw instruction supplied from the CPU 80a and converts obtained image data to a video signal, which is supplied to the display device 80h.

The I/F 80f permits exchange of data with the external storage device 80j, entry of data from the input device 80i, and exchange of data with the backup apparatus 100 through the network 90.

The bus 80g interconnects the CPU 80a, ROM 80b, RAM 80c, HDD 80d, GB 80e and I/F 80f, and permits exchange of data between these elements.

The display device 80h comprises a CRT (Cathode Ray Tube) monitor, for example, and displays the video signal output from the GB 80e.

The input device 80i includes, for example, a keyboard, a mouse, etc. as input devices, and generates and outputs data in accordance with the operator's manipulation.

The external storage device 80j is constituted by a plurality of HDDs or the like, for example, stores data supplied from the CPU 80a in a predetermined region thereof, and at the request of the CPU 80a, reads out and supplies corresponding data.

The backup apparatus 100 is identical in construction to the database apparatus 80, and detailed description thereof is therefore omitted.

Operation of the embodiment constructed as above will be now described.

Figure 3:
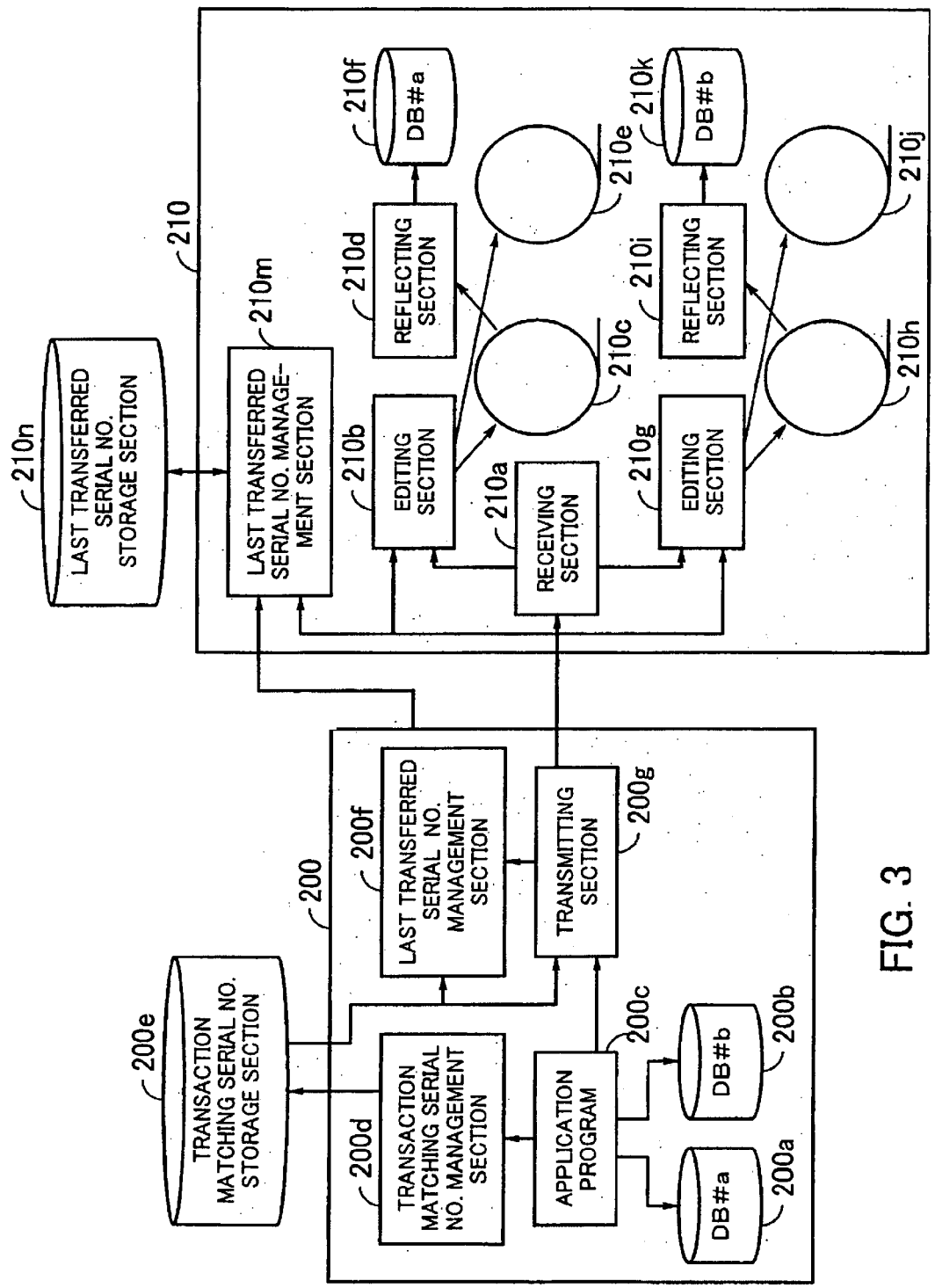
FIG. 3 is a diagram exemplifying functional blocks according to the present invention.

FIG. 3 illustrates functional blocks of the database apparatus 80 and the backup apparatus 100 shown in FIG. 2. The functions represented by the blocks are accomplished when predetermined programs stored in the HDDs 80d and 100d are executed.

As shown in FIG. 3, the database apparatus 80 functions as a main function section 200 and a transaction matching serial number storage section 200e. The main function section 200 comprises a DB#a 200a, a DB#b 200b, an application program 200c, a transaction matching serial number management section 200d, a last transferred serial number management section 200f, and a transmitting section 200g.

The DB#a 200a and the DB#b 200b have contents thereof updated based on data which is generated as a result of transactions executed by the application program 200c.

The application program 200c executes a variety of processes on a transaction-by-transaction basis and, when a transaction is completed, updates data stored in the DB#a 200a and the DB#b 200b.

The transaction matching serial number management section 200d issues serial numbers for the transactions executed by the application program 200c and manages the issued numbers as matching serial numbers.

The transaction matching serial number storage section 200e stores the transaction matching serial numbers.

The last transferred serial number management section 200f manages, as log files, the last serial numbers of journals that have already been transferred to the backup apparatus 100.

The transmitting section 200g transmits journals generated as a result of transactions to the backup apparatus 100.

The backup apparatus 100 functions as a main function section 210 and a last transferred serial number storage section 210n. The main function section 210 comprises a receiving section 210a, an editing section 210b, an edited data set storage section 210c, a reflecting section 210d, a spanned data storage section 210e, a DB#a 210f, an editing section 210g, an edited data set storage section 210h, a reflecting section 210i, a spanned data storage section 210j, and a DB#b 210k.

The receiving section 210a receives the journals transmitted from the transmitting section 200g.

The editing section 210b acquires journals associated with the DB#a 200a, among those received by the receiving section 210a, and performs rearrangement of order of the journals as well as the process for verifying the interrelation of the journals.

The edited data set storage section 210c stores journals of which the interrelation with journals associated with the DB#b 200b has been verified, among those edited by the editing section 210b.

The reflecting section 210d updates the contents of the DB#a 210f based on the journals whose interrelation has been verified.

The spanned data storage section 210e stores journals whose interrelation could not be verified.

The editing section 210g acquires journals associated with the DB#b 200b, among those received by the receiving section 210a, and performs rearrangement of order of the journals as well as the process for verifying the interrelation of the journals.

The edited data set storage section 210h stores journals of which the interrelation with journals associated with the DB#a 200a has been verified, among those edited by the editing section 210g.

The reflecting section 210i updates the contents of the DB#b 210k based on the journals whose interrelation has been verified.

The spanned data storage section 210j stores journals whose interrelation could not be verified.

Specific operations of the above functional blocks will be now described.

If a certain transaction is executed by the application program 200c and as a result the DB#a 200a is updated, a journal is created and supplied to the transmitting section 200g.

The transmitting section 200g has buffers reserved for the respective DBs, and the journal supplied from the application program 200c is stored in the buffer reserved for the DB#a 200a.

At this time, the transaction matching serial number management section 200d increments the transaction matching serial number by "1". In this example, the transaction conducted is the first transaction, and accordingly, the matching serial number is incremented to "1". The matching serial number is supplied to the transaction matching serial number storage section 200e to be stored therein, and then supplied to the last transferred serial number management section 200f and the transmitting section 200g. The matching serial number is stored in the transaction matching serial number storage section 200e, because the storage section 200e is a nonvolatile memory and thus the data stored therein can be retained even in case of damage to the apparatus.

The transmitting section 200g acquires the matching serial number supplied from the transaction matching serial number storage section 200e, and affixes the acquired serial number to the journal newly stored in the buffer thereof, as transaction matching information.

FIG. 4 illustrates the data structure of a journal stored in the buffer. As shown in FIG. 4, the journal is constituted by transaction matching information 250, DB identification information 251, region specification information 252, and update content information 253.

Figure 5:
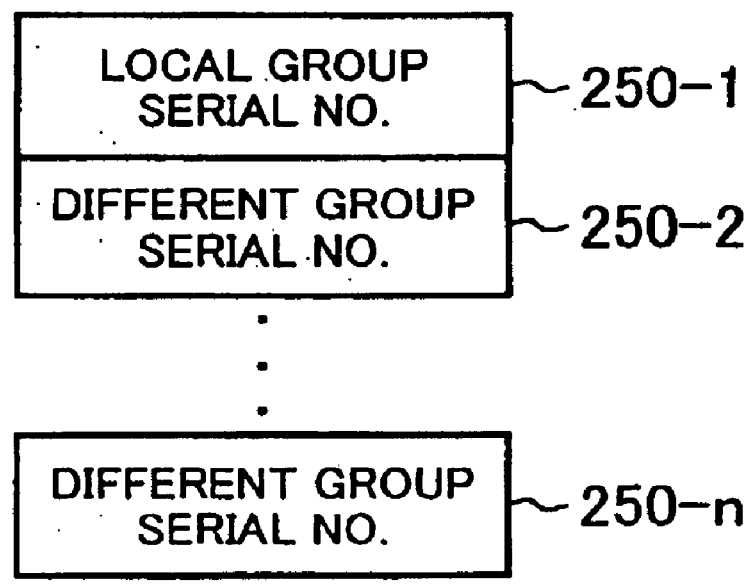
FIG. 5 is a diagram showing in detail transaction matching information appearing in FIG. 4.

The transaction matching information 250 includes, as shown in FIG. 5, a local group serial number 250-1, and different group serial numbers 250-2 to 250-n. The term "group" denotes DB, and journals created with respect to an identical DB belong to the same group.

The local group serial number 250-1 is a serial number assigned to the group concerned and is common to all groups.

The different group serial number is information indicating the serial number of a journal which belongs to a different group and which is interrelated with the journal concerned.

In the example shown in FIG. 3, the number of DBs is two, and therefore, there exists only one different group serial number (i.e., n=2).

Referring again to FIG. 4, the DB identification information 251 is information specifying a DB corresponding to the group concerned.

The region specification information 252 is information specifying a region of the DB to be updated.

The update content information 253 is information indicating contents to be updated.

Figure 6:
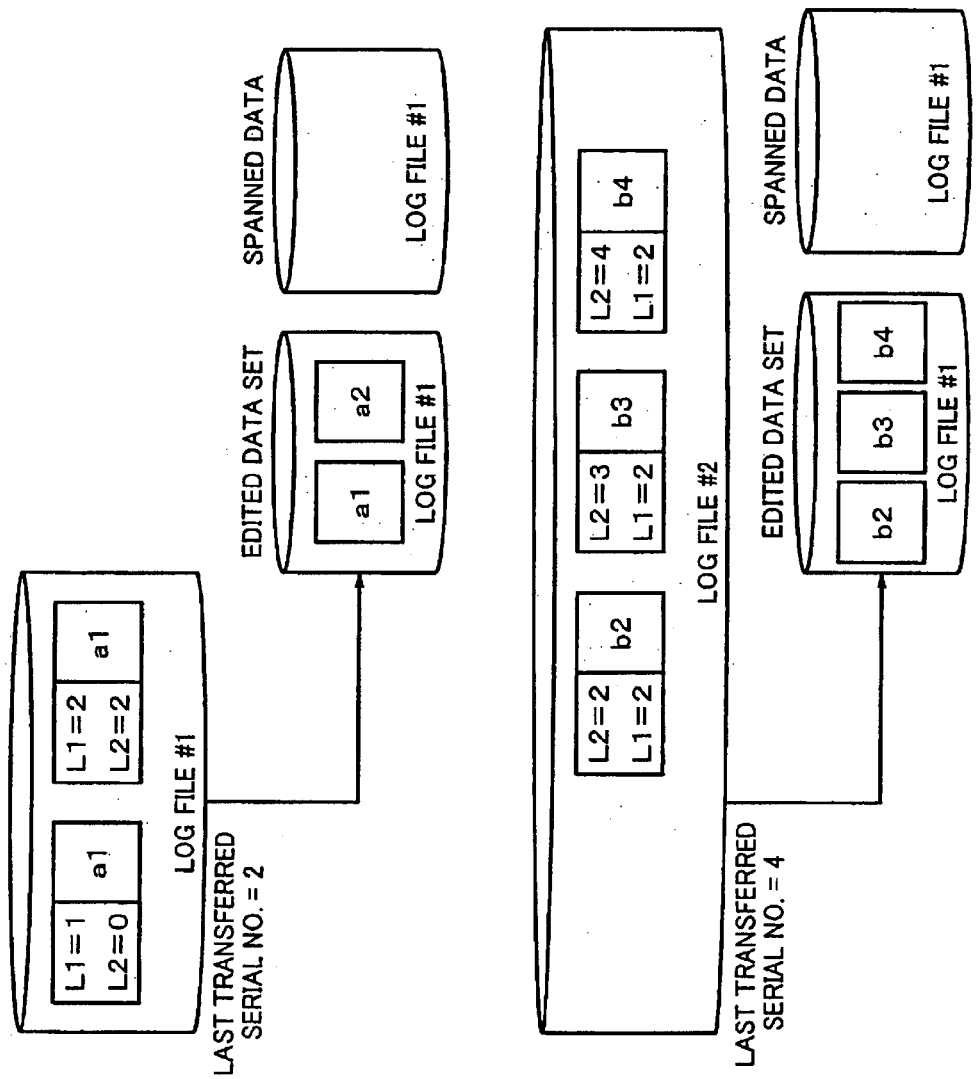
FIG. 6 is a diagram showing an example of process flow for journals.

In the aforementioned example, the DB#a 200a alone has been updated; therefore, provided that the newly stored journal is a1 as shown in the upper left corner of FIG. 6, the journal a1 is affixed with "1" (L1=1) as the local group serial number, and with "0" (L2=0) as the different group serial number because there is no interrelated journal.

Then, if a new transaction is conducted and both of the DB#a 200a and the DB#b 200b are updated, journals a2 and b2 are created and stored in the transmitting section 200g.

In this case, the transaction matching serial number management section 200d supplies "2", which is obtained by incrementing the transaction matching serial number, to the transaction matching serial number storage section 200e.

The matching serial number thus stored in the transaction matching serial number storage section 200e is supplied to the transmitting section 200g.

The transmitting section 200g acquires the matching serial number and affixes the same to the journals a2 and b2 stored therein as their local group serial number 250-1 (L1=2, L2=2). Also, since the matching serial number of the interrelated journal is "2", L2=2 and L1=2 are affixed to the journals a2 and b2, respectively, as their different group serial number 250-2.

Subsequently, if a new transaction is conducted and the DB#b 200b alone is updated, an operation similar to the above is performed. Specifically, a journal b3 is stored in the corresponding buffer of the transmitting section 200g, and "3" is supplied from the transaction matching serial number storage section 200e as the serial number and is affixed to the journal b3 as the local group serial number 250-1 (L2=3 is stored).

Since a journal a3 does not exist, "2", which is the serial number of the immediately preceding journal, is stored (L1=2 is stored) as the different group serial number 250-2.

Further, if a new transaction is conducted and the DB#b 200b alone is updated, a journal b4 is stored in the corresponding buffer of the transmitting section 200g, and "4" is supplied from the transaction matching serial number storage section 200e as the serial number and is affixed to the journal b4 as the local group serial number 250-1 (L2=4 is stored), following the same procedure as described above.

Also, since a journal a4 does not exist, "2", which is the serial number of the immediately preceding journal, is stored (L1=2 is stored) as the different group serial number 250-2.

As a result of the above process, the journals a1, a2 and the journals b2-b4 are stored in the respective buffers of the transmitting section 200g, as shown in FIG. 6.

With journals stored in this manner, if the transmitting section 200g judges that its buffers have become full (or that a predetermined time has elapsed), the journals stored in the buffers are transmitted to the backup apparatus 100.

At this time, the last transferred serial number management section 200f acquires the serial numbers of the last journals transmitted from the transmitting section 200g, and notifies the backup apparatus 100 of the acquired serial numbers. In the illustrated example, the journals a2 and b4 are the last journals, and accordingly, "2" and "4" are notified.

The receiving section 210a of the backup apparatus 100 classifies the journals received from the transmitting section 200g according to their groups, and supplies the classified journals to the respective editing sections 210b and 210g.

The editing sections 210b and 210g individually rearrange the order of the journals by their local group serial numbers. On completion of the rearrangement, the editing sections 210b and 210g acquire the last transferred serial numbers of the respective groups from the last transferred serial number management section 210m. In this example, the editing sections 210b and 210g acquire "2" and "4", respectively.

Subsequently, each of the editing sections 210b and 210g acquires the different group serial number 250-2 from the journal therein, compares the acquired number with the last transferred serial number, and if the different group serial number 250-2 is smaller than or equal to the last transferred serial number, stores the journal in the corresponding edited data set storage section 210c, 210h. If the different group serial number 250-2 is greater than the last transferred serial number, the journal concerned and the succeeding journals are supplied to and stored in the corresponding spanned data storage section 210e, 210j. In other words, interrelated journals are stored in the edited data set storage section 210c, 210h while other noninterrelated journals are stored in the spanned data storage section 210e, 210j.

When the process has been completed for all journals, the reflecting sections 210d and 210i update the DB#a 210f and the DB#b 210k, respectively, based on the journals stored in the respective edited data set storage sections 210c and 210h.

The aforementioned process enables the DB#a 210f to hold a backup of the contents of the DB#a 200a, and also enables the DB#b 210k to hold a backup of the contents of the DB#b 200b.

Even if, in the state shown in FIG. 6, the system is damaged due to disaster, it is possible to determine whether there exists an interrelated journal or not by looking up the different group serial number, whereby the DBs can be updated while minimizing the spanned data.

Referring lastly to flowcharts, the manner of how the aforementioned process is carried out will be explained.

Figure 7:
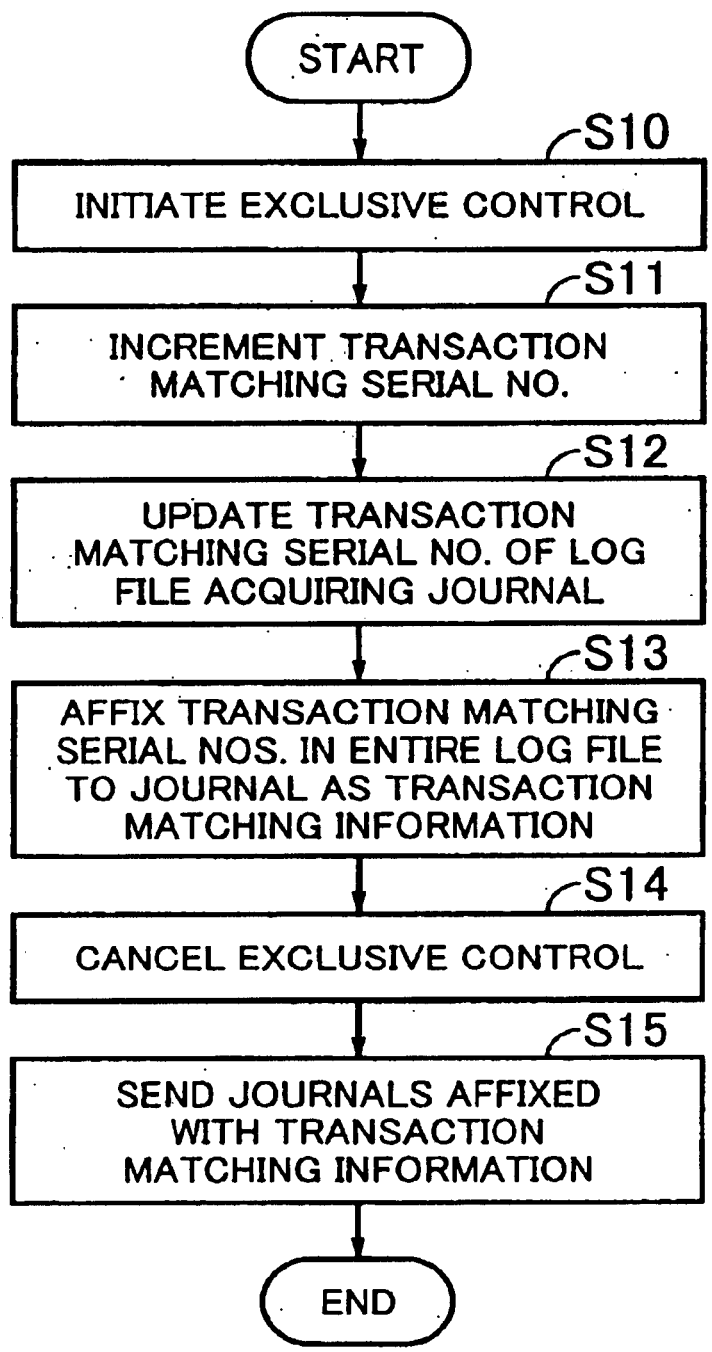
FIG. 7 is a flowchart illustrating an example of process executed by a transaction matching serial number management section and a transmitting section.

FIG. 7 is a flowchart illustrating an example of process executed in the transaction matching serial number management section 200d and the transmitting section 200g when a transaction has been completed. Upon start of the process shown in the flowchart, the following steps are executed.

Step S10:

The main function section 200 initiates exclusive control in order to avoid interference with other transactions.

Step S11:

The transaction matching serial number management section 200d increments the transaction matching serial number by "1".

Step S12:

The transmitting section 200g acquires the transaction matching serial number which was output from the transaction matching serial number management section 200d and which has been stored in the transaction matching serial number storage section 200e, and updates the matching serial number of the log file that acquires the journal, that is, the matching serial number of the journal stored in the buffer.

Step S13:

The transmitting section 200g affixes the transaction matching serial numbers in the entire log file to the journal as the transaction matching information. Namely, the matching serial numbers of different groups are affixed as the different group serial numbers 250-2 to 250-n.

Step S14:

The main function section 200 cancels the exclusive control.

Step S15:

If the journals accumulated in the buffers have reached a certain amount, the transmitting section 200g transmits the journals.

The process described above makes it possible to affix the local group serial number 250-1 as well as the different group serial numbers 250-2 to 250-n to each journal and to transmit the journal.

Figure 8:
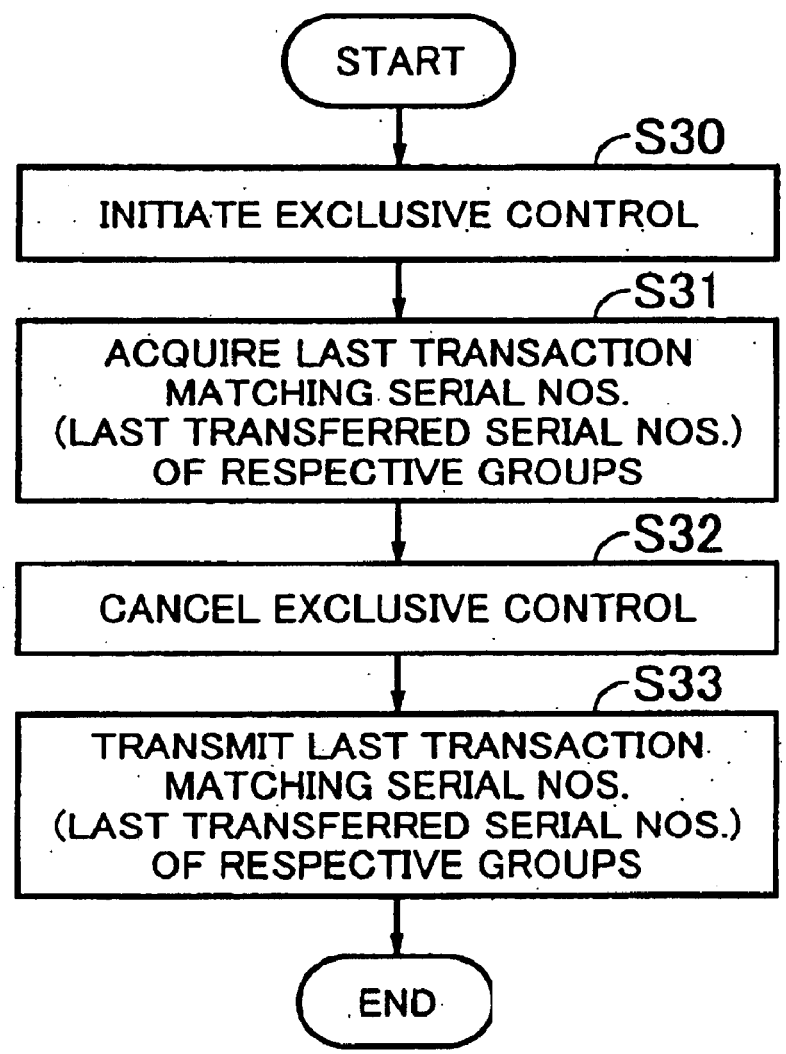
FIG. 8 is a flowchart illustrating a process executed by a last transferred serial number management section when a journal is transferred by the transmitting section.

Referring now to FIG. 8, a process executed in the last transferred serial number management section 200f when the journals are transferred by the transmitting section 200g will be described. Upon start of the process shown in the flowchart, the following steps are executed.

Step S30:

The main function section 200 initiates exclusive control in order to prevent updating from taking place while the matching serial number is acquired.

Step S31:

The last transferred serial number management section 200f acquires the last transaction serial numbers of the respective groups, that is, the last transferred serial numbers.

Step S32:

The main function section 200 cancels the exclusive control.

Step S33:

The last transferred serial number management section 200f transmits the last transferred serial numbers.

Figure 9:
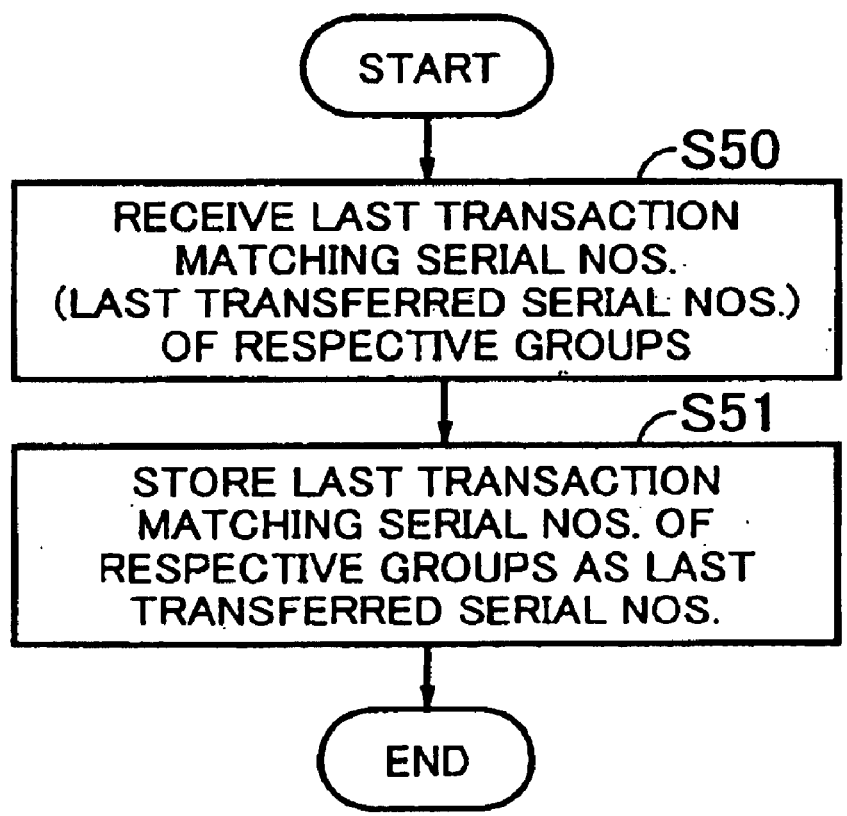
FIG. 9 is a flowchart illustrating a process for reception of a last transferred serial number by a last transferred serial number management section of a backup apparatus.

The above process makes it possible to acquire the last transferred serial numbers of the respective groups and to transmit the same to the backup apparatus Referring now to FIG. 9, a process for receiving the last transferred serial numbers by the last transferred serial number management section 210m of the backup apparatus 100 will be explained.

Upon start of the process shown in the flowchart, the following steps are executed.

Step S50:

The last transferred serial number management section 210m receives the last transaction matching serial numbers, that is, the last transferred serial numbers of the respective groups transmitted from the database apparatus 80.

Step S51:

The last transferred serial number management section 210m classifies the last transferred serial numbers according to their groups and stores the classified serial numbers in the last transferred serial number storage section 210n.

The above process makes it possible to receive the last transferred serial numbers and to store the same in the last transferred serial number storage section 210n.

Figure 10:
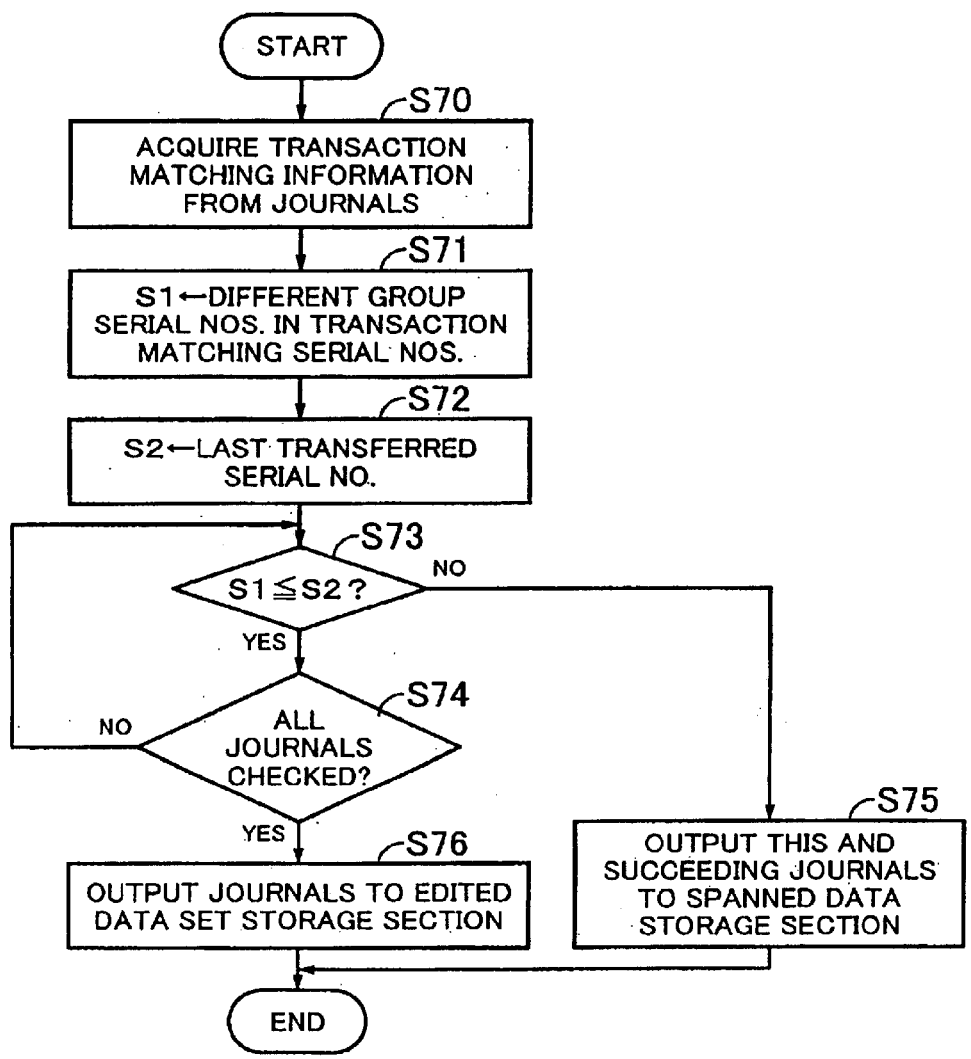
FIG. 10 is a flowchart illustrating a process executed by an editing section upon receipt of a journal.
Figure 11:
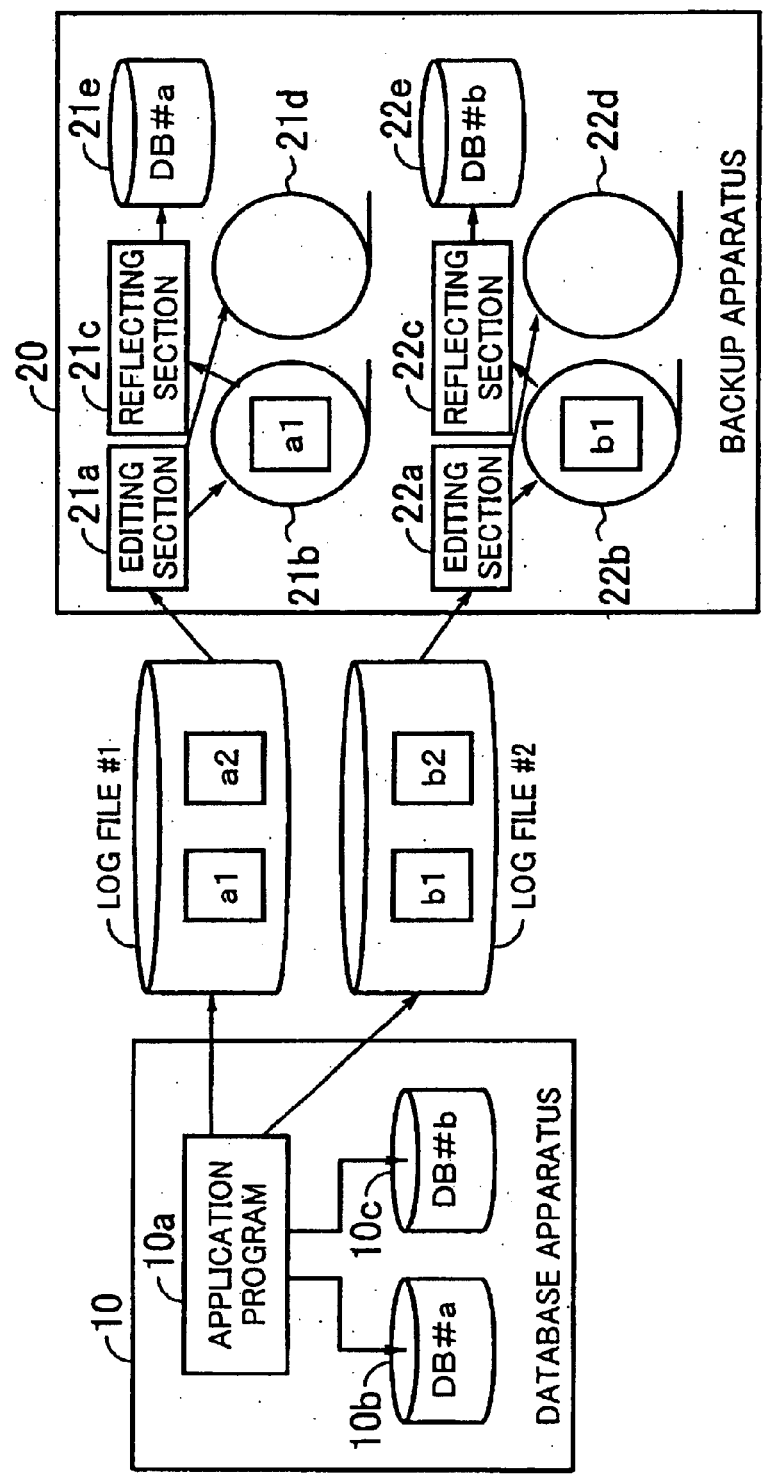
FIG. 11 is a conceptual diagram illustrating operation of a conventional database apparatus in combination with a backup apparatus.
Figure 12:
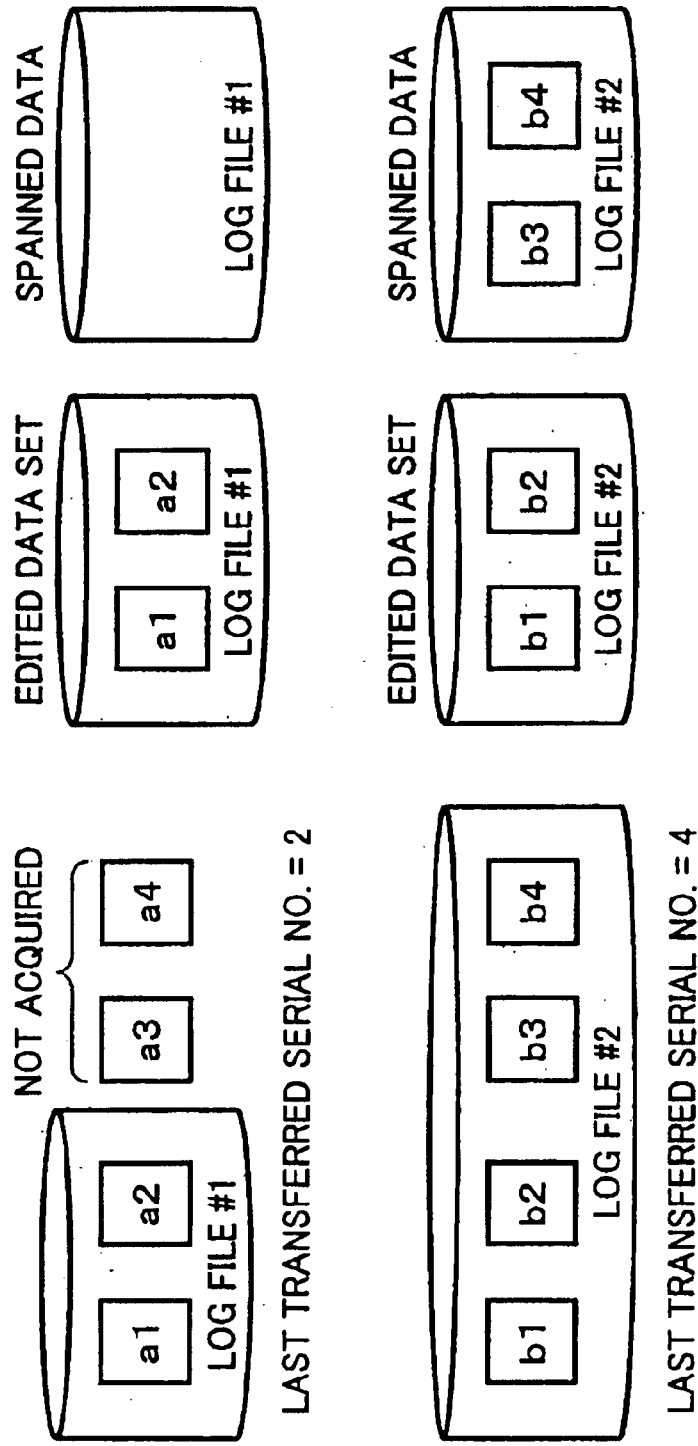
FIG. 12 is a diagram illustrating an example of process flow for journals in the conventional database apparatus and backup apparatus.

Referring now to FIG. 10, a process executed by the editing sections 210b and 210g on reception of journals will be explained. Upon start of the process shown in the flowchart, the steps described below are executed. The editing sections 210b and 210g operate in the same manner except that the groups of journals they acquire are different, and accordingly, in the following description, the editing section 210b is taken as an example.

Step S70:

The editing section 210b acquires the transaction matching information 250 from journals belonging to its own group, among those received by the receiving section 210a.

Step S71:

The editing section 210b substitutes the different group serial number in the acquired transaction matching serial numbers for a variable S1. In cases where there are a plurality of different group serial numbers, the different group serial numbers are substituted for respective elements of an array S1[ ], instead of the variable S1.

Step S72:

The editing section 210b acquires the last transferred serial number of its own group from the last transferred serial number storage section 210n and substitutes the acquired serial number for a variable S2.

Step S73:

The editing section 210b compares the variables S1 and S2 with each other. If S1 is smaller than or equal to S2, the flow proceeds to Step S74; if not, the flow proceeds to Step S75. Where S1 is an array, all elements of the array are compared with S2.

Step S74:

The editing section 210b determines whether or not all journals have been checked. If all journals have been checked, the flow proceeds to Step S76; if not, the flow returns to Step S73 to execute the same.

Step S75:

The editing section 210b outputs the journal concerned and the succeeding journals to the spanned data storage section 210e to be stored therein.

Step S76:

The editing section 210b outputs the journals to the edited data set storage section 210c to be stored therein.

The process described above permits journals interrelated with different groups to be distinguished from other noninterrelated journals, so that the interrelated journals may be stored in the edited data set storage section 210c while the noninterrelated journals may be stored in the spanned data storage section 210e.

In the foregoing embodiments is described a case where the number of types of DBs is two, by way of example. Needless to say, the number of types of DBs to be used is not limited to two, and the present invention can be applied to database apparatus having three or more types of DBs.

Also, in the foregoing, the serial numbers of journals belonging to different groups are used as the different group serial numbers 250-2 to 250-n, but similar advantages can be obtained equally by using information indicating the presence/absence of other groups.

Further, the processing function described above can be implemented by a combination of a server computer and a client computer. In this case, a server program is provided in which is described a process for performing the function of the database apparatus 80, and also a client program is provided in which is described a process for performing the function of the backup apparatus 100. The server program is executed by the server computer, whereby the processing function of the database apparatus 80 can be fulfilled by the server computer. Also, the client program is executed by the client computer, whereby the processing function of the backup apparatus 100 can be fulfilled by the client computer.

The server and client programs describing the aforementioned processes may be recorded in a computer-readable recording medium. The computer-readable recording medium includes magnetic recording device, optical disk, magneto-optical recording medium, semiconductor memory, etc. Such a magnetic recording device may be hard disk drive (HDD), flexible disk (FD), magnetic tape, etc. As the optical disk, DVD (Digital Versatile Disk), DVD-RAM (Random Access Memory), CD-ROM (Compact Disk Read Only Memory), CD-R (Recordable)/RW (ReWritable) or the like may be used. The magneto-optical recording medium includes MO (Magneto-Optical disk) etc.

To distribute the server or client program, portable recording media, such as DVD and CD-ROM, in which the program is recorded may be put on sale. Also, the client program may be stored in the storage device of the server computer and may be transferred from the server computer to client computers through a network.

The server program recorded in a portable recording medium, for example, is stored in the storage device of the server computer which is to execute the server program. The server computer loads the server program from its storage device and performs processing in accordance with the server program. Alternatively, the server computer may read in the server program directly from the portable recording medium to perform processing in accordance with the server program.

The client program recorded in a portable recording medium or transferred from the server computer, for example, is stored in the storage device of the client computer which is to execute the client program. The client computer loads the client program from its storage device and performs processing in accordance with the client program. Alternatively, the client computer may read in the client program directly from the portable recording medium to perform processing in accordance with the client program. Further, the client computer may perform processing in accordance with the client program each time the client program is transferred from the server computer.

As described above, according to the present invention, a backup system includes a database apparatus having a plurality of databases and a backup apparatus for holding a backup of information stored in the database apparatus, wherein the database apparatus comprises update information generating means for generating, with respect to the individual databases, update information indicating contents of updates of the databases, interrelation information generating means for generating interrelation information indicating an interrelation between the update information for a certain database and the update information for other databases, and transmitting means for transmitting the update information and the interrelation information to the backup apparatus, and the backup apparatus comprises receiving means for receiving the update information and the interrelation information transmitted from the database apparatus, backup databases for holding backups of contents of the databases owned by the database apparatus, interrelation determining means for looking up the interrelation information received by the receiving means to determine the interrelation of each update information, and updating means for updating the backup databases based on the update information of which the interrelation is verified by the interrelation determining means. Accordingly, irrecoverable data can be minimized in the event the system is damaged due to an earthquake or the like.

Also, there is provided a database apparatus having a plurality of databases, the database apparatus comprising update information generating means for generating, with respect to the individual databases, update information indicating contents of updates of the databases, interrelation information generating means for generating interrelation information indicating an interrelation between the update information for a certain database and the update information for other databases, and transmitting means for transmitting the update information and the interrelation information to a backup apparatus. Thus, even if the system is damaged due to an earthquake or the like, service can be promptly resumed by the backup apparatus.

Further, there is also provided a backup apparatus for holding a backup of information stored in a database apparatus, the backup apparatus comprising receiving means for receiving update information and interrelation information transmitted from the database apparatus, backup databases for holding backups of contents of databases owned by the database apparatus, interrelation determining means for looking up the interrelation information received by the receiving means to determine the interrelation of each update information, and updating means for updating the backup databases based on the update information of which the interrelation is verified by the interrelation determining means. Accordingly, even if the database apparatus is damaged due to an earthquake or the like, service can be promptly resumed.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A backup system including a database apparatus having a plurality of databases and a backup apparatus for holding a backup of information stored in the database apparatus, wherein said database apparatus comprises:

update information generating means for generating, with respect to the individual databases, update information indicating contents of updates of the databases;

interrelation information generating means for generating interrelation information indicating an interrelation between the update information for a certain database and the update information for other databases; and transmitting means for transmitting the update information and the interrelation information to said backup apparatus, and said backup apparatus comprises:

receiving means for receiving the update information and the interrelation information transmitted from said database apparatus;

backup databases for holding backups of contents of the databases owned by said database apparatus;

interrelation determining means for looking up the interrelation information received by said receiving means to determine the interrelation of each said update information; and updating means for updating said backup databases based on the update information of which the interrelation is verified by said interrelation determining means;

wherein the interrelation information is a serial number, and if there exists no other update information interrelated with the update information concerned, a serial number of immediately preceding update information is affixed to the update information concerned.

2. The backup system according to claim 1, wherein said database apparatus further comprises affixing means for affixing the interrelation information to the update information, and said backup apparatus further comprises extracting means for extracting the interrelation information from the update information received by said receiving means.

3. The backup system according to claim 1, wherein the interrelation information is information indicating presence/absence of other update information interrelated with the update information concerned.

4. A database apparatus having a plurality of databases, comprising:

update information generating means for generating, with respect to the individual databases, update information indicating contents of updates of the databases;

interrelation information generating means for generating interrelation information indicating an interrelation between the update information for a certain database and the update information for other databases; and transmitting means for transmitting the update information and the interrelation information to a backup apparatus;

wherein the interrelation information is a serial number, and if there exists no other update information interrelated with the update information concerned, a serial number of immediately preceding update information is affixed to the update information concerned.

5. A backup method for a database apparatus having a plurality of databases, comprising:

an update information generation step of generating, with respect to the individual databases, update information indicating contents of updates of the databases;

an interrelation information generation step of generating interrelation information indicating an interrelation between the update information for a certain database and the update information for other databases; and a transmission step of transmitting the update information and the interrelation information to a backup apparatus;

wherein the interrelation information is a serial number, and if there exists no other update information interrelated with the update information concerned, a serial number of immediately preceding update information is affixed to the update information concerned.

6. A program for causing a computer to function as a database apparatus having a plurality of databases, wherein said computer functions as:

update information generating means for generating, with respect to the individual databases, update information indicating contents of updates of the databases;

interrelation information generating means for generating interrelation information indicating an interrelation between the update information for a certain database and the update information for other databases; and transmitting means for transmitting the update information and the interrelation information to a backup apparatus;

wherein the interrelation information is a serial number, and if there exists no other update information interrelated with the update information concerned, a serial number of immediately preceding update information is affixed to the update information concerned.

* * * * *